Sept. 1, 1959            W. C. BAKER            2,901,922

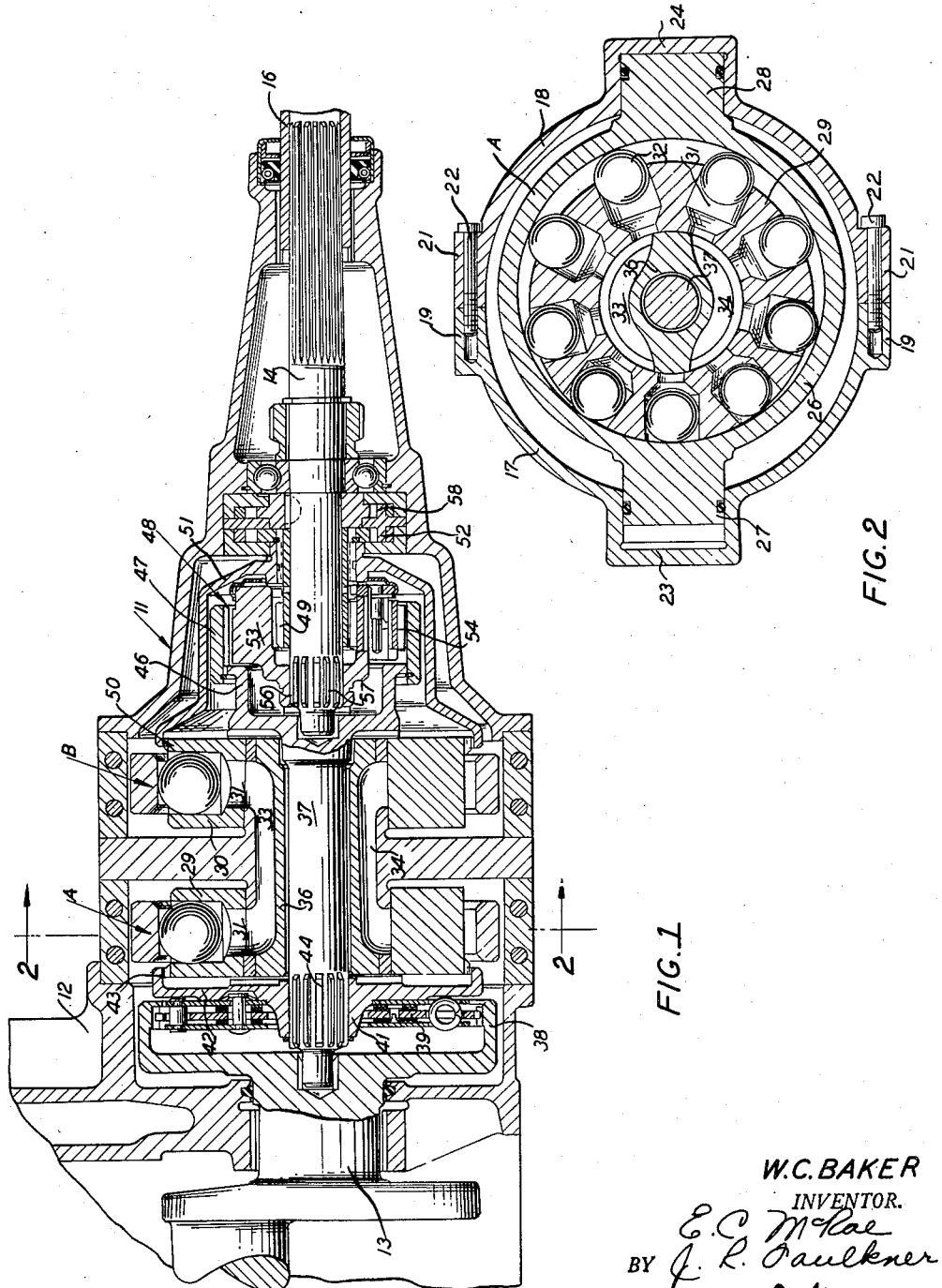

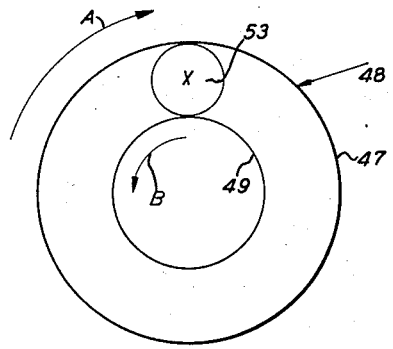
NEUTRAL
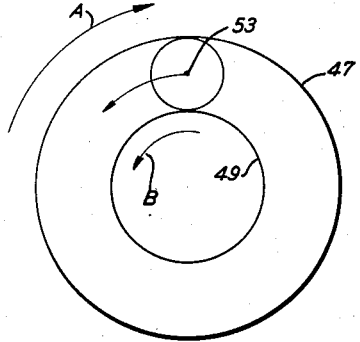
REVERSE
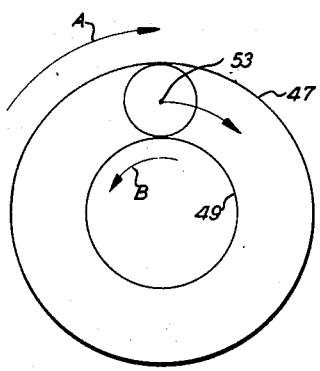
FORWARD UNDERDRIVE
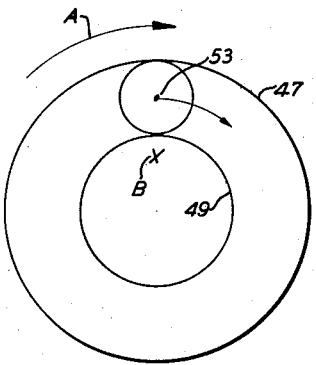
FORWARD DIRECT GEAR DRIVE
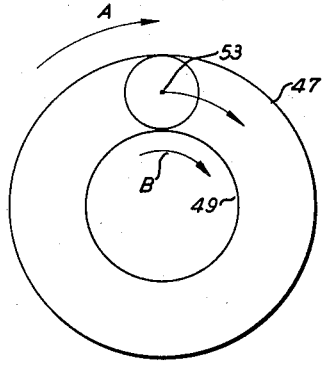
FORWARD DRIVE
FIG.3

MOTOR VEHICLE TRANSMISSION

Filed Nov. 8, 1955            3 Sheets-Sheet 3

NEUTRAL

DIRECT GEAR

OVERDRIVE

W. C. BAKER
INVENTOR.

BY E. C. McRae
J. L. Faulkner
D. H. Oster

ATTORNEYS

United States Patent Office 2,901,922
Patented Sept. 1, 1959

2,901,922

MOTOR VEHICLE TRANSMISSION

Willard C. Baker, Plymouth, Mich., assignor to Ford Motor Company, Dearborn, Mich., a corporation of Delaware Application November 8, 1955, Serial No. 545,724

16 Claims. (Cl. 74—687)

This application relates generally to motor vehicle transmissions, and has particular reference to continuously variable hydraulic transmissions for motor vehicles.

It is an object of the present invention to provide a transmission which is continuously variable from reverse through neutral to overdrive, in which the power flow may be split between hydraulic and mechanical paths, and in which high over-all efficiency may be obtained by reducing the power transmitted hydraulically to near zero or zero to obtain mechanical gear efficiency throughout an important phase of vehicle operation. The transmission also provides high efficiency during the cruising or overdrive range of operation.

A further object of the invention is to provide a continuously variable motor vehicle transmission incorporating simplicity and ease of control without the necessity of utilizing bands, clutches, synchronizing devices, and other expensive and complicated control mechanisms. The transmission incorporates controls automatically operable to provide satisfactory over-all performance and economy of operation under normal operating conditions, but having manually operable controls to modify the automatic function to obtain additional power for acceleration and hill climbing, to obtain dynamic braking for deceleration, and to properly control the vehicle during parking operations.

Still another object of the invention is to provide a transmission of the type mentioned above which is relatively small in size to reduce the drive shaft clearance and provide more space in the passenger compartment of the vehicle.

A further object of the invention is to provide a transmission relatively inexpensive to manufacture and incorporating a simple planetary gearset and relatively small and inexpensive hydraulic units, together with a minimum of controls.

Other objects and advantages of this invention will be made more apparent as this description proceeds, particularly when considered in connection with the accompanying drawings, wherein:

Figure 1 is a vertical longitudinal cross sectional view through a motor vehicle transmission incorporating the present invention.

Figure 2 is a transverse cross sectional view taken on the line 2—2 of Figure 1.

Figure 3 illustrates diagrammatically the operation of the planetary gearset during various conditions.

Figure 4:
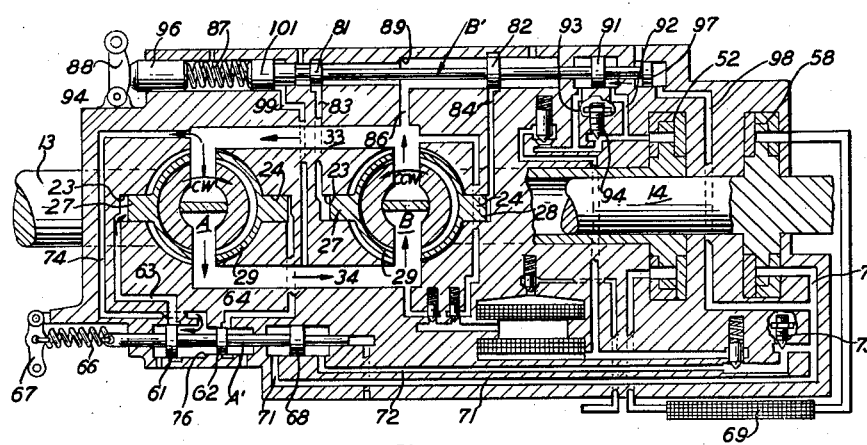
Figure 4 is a cross sectional view, semidiagrammatic in character, illustrating the hydraulic units and the control mechanisms therefor, with the parts thereof being shown in neutral.

Referring now to the drawings, and particularly to Figures 1 and 2, the reference character 11 indicates generally a transmission housing secured to the rearward end of the engine block 12 of a motor vehicle engine. An engine crankshaft 13 is journaled in the engine block 12 and forms the input shaft for the transmission. An output shaft 14 is journaled in the rearward portion of the transmission housing 11, and is splined to a propeller shaft 16 conventionally connected to the differential and rear axle of the motor vehicle to drive the rear road wheels thereof.

A pair of hydraulic units A and B are mounted in the transmission housing 11 adjacent the forward end thereof. The hydraulic unit A is of the variable displacement type, and while the unit B may be of either fixed or variable displacement it is shown in the present construction as also being of variable displacement, the two units being similar in construction.

Referring now to Figure 2, it will be seen that each hydraulic unit has a casing formed of a pair of complementary semicylindrical sections 17 and 18 having end flanges 19 and 21 suitably secured together by bolts 22. The casing sections 17 and 18 are formed with centrally located integral cylinders 23 and 24 arranged in alignment with each other at diametrically opposite sides of the hydraulic unit.

Each hydraulic unit has a cylindrical body 26 provided with diametrically aligned integral piston portions 27 and 28 reciprocable within the cylindrical portions 23 and 24 of the casing. Rotatably mounted within the casing of the hydraulic unit and concentric with the crankshaft or input shaft 13 is a rotor 29 having a plurality of angularly spaced radially extending cylinders 31 each containing a ball or piston member 32. The balls 32 ride against the interior surface of the cylindrical body 26 and, due to the eccentric relationship between the body 26 and the rotor 29, act as either a hydraulic pump or a motor depending upon whether or not power is being supplied to the unit mechanically or hydraulically.

Referring now particularly to Figure 1, it will be noted that the radial cylinders 31 of the rotors 29 of the hydraulic units A and B are interconnected by means of manifolds 33 and 34 formed in a central sleeve 36 concentrically surrounding the drive shaft 37. It will thus be seen that the manifolds 33 and 34 interconnect the hydraulic units A and B hydraulically so that the output of unit A may be connected to the input of unit B and the output of unit B connected to the input of unit A.

The engine crankshaft 13 is provided with an annular flange 38 connected by a flexible driving unit 39 to the hub 41 of the driving flange 42. The driving flange 42 has peripheral teeth 43 engaging corresponding teeth on the rim of the rotor 29 of the hydraulic unit A so that unit A will be constantly driven in a clockwise direction at the speed of the vehicle engine.

The hub 41 of the driving flange 42 is splined at 44 to the drive shaft 37, which at its rearward end is formed with an integral annular flange 46 nonrotatably connected to the ring gear 47 of a planetary gearset 48. The sun gear 49 of the planetary gearset is connected through the hub 51 to the peripherally toothed portion 50 of the rotor 30 of the hydraulic unit B so as to be controlled thereby. The hub 51 is also connected to a hydraulic pump 52 mounted within the transmission housing 11.

The planetary gearset 48 is completed by means of a planet carrier 53 carrying planet pinions 54 meshing with the ring gear 47 and the sun gear 49. The hub 56 of the planet carrier 53 is splined at 57 to the forward end of the output shaft 14. Also keyed to the output shaft 14 to be driven thereby is a second or rear pump 58.

Although the transmission is of the continuously variable type, the operation of the transmisson can best be understood from a consideration of the five different stages of operation shown diagrammatically in Figure 3. These stages include neutral, reverse, and three phases of forward operation, namely underdrive, direct mechanical drive, and overdrive. These stages of operation are achieved through the planetary gearset by controlling the displacement of the hydraulic units A and B. Unit B may be of fixed displacement but is shown here as being variable. Unit A must be of variable displacement and is preferably variable from full displacement in one direction through zero to full displacement in the opposite direction. In this manner hydraulic unit A controls the speed and direction and rotation of unit B, which, through its connection to the sun gear of the planetary gearset, controls the speed and torque applied to the output shaft of the transmission.

Neutral

Referring to the diagram shown in Figure 3, it will be seen that zero speed of the output shaft of the transmission can be obtained by rotating the sun gear 49 in a direction opposite to the rotation of the ring gear 47 and at a speed such that the planet carrier 53 remains stationary. The design of the planetary gearset may be such as to achieve economy of manufacture and also to provide a direct geared ratio through the planetary gearset of such magnitude as to achieve the maximum mechanical drive and the minimum hydraulic drive during the operating range including the mean power-factor for the vehicle so as to attain maximum economy and prolong the life of the transmission components. In the present instance the ratio between the ring gear and sun gear has been selected as 2 to 1, and to hold the carrier 53 stationary the sun gear 49 must be rotated counterclockwise at twice the speed of the clockwise rotation of the ring gear 47. This is accomplished with the hydraulic unit B operating at half displacement and with the hydraulic unit A operating at full displacement in the opposite direction so that A will operate as a pump and B as a motor with B being driven at twice the speed of A in the opposite direction.

Reverse

As seen in the diagrammatic sketch of Figure 3, reverse or counterclockwise rotation of the carrier 53 can be obtained by increasing the counterclockwise rotation of the sun gear 49. This is obtained by decreasing the displacement of hydraulic unit B so that it will rotate faster relative to unit A than in neutral, to increase the counterclockwise rotation of the sun gear 49 and produce a reverse or counterclockwise rotation of the planet carrier 53 and the output shaft 14.

Forward—underdrive

Forward speed drive is obtained first by gradually increasing the displacement of unit B to full displacement, with unit B operating as a pump and unit A as a motor at full displacement. Next the displacement of unit A is gradually decreased from its full displacement in neutral, resulting in decreasing the speed of rotation of unit B in a counterclockwise direction and correspondingly reducing the speed of the sun gear 49 in a counterclockwise direction. This results in a clockwise rotation of the planet carrier 53 and output shaft, in a continuously variable manner. This underdrive, so termed because it is a reduction greater than obtained during a direct mechanical drive through the planetary gearset, is continuously variable and continues until the displacement of unit A has been decreased to zero, at which time the unit B and sun gear 49 will not be rotated but will remain stationary.

It will be noted that units A and B are at or near full displacement and at or near full speed when high hydraulic power and torque are required. Since both hydraulic units are operating at neutral, the problem of static friction is eliminated for the initial vehicle forward speed movement so that relatively small hydraulic units may be used for relatively high power transmittal. The fact that the torque of unit A is multiplied through the planetary gearing, and the fact that both of the hydraulic units operate at each side of zero, make possible the use of relatively small hydraulic units.

Forward—direct mechanical drive

With the displacement of unit A at zero, as described above, and with the sun gear accordingly held stationary, a forward rotation of the planet carrier 53 will result with all of the power supplied by the engine crankshaft being transmitted through the planetary gearset and with none being transmitted through the hydraulic units. This is termed a direct mechanical drive and its ratio or reduction will of course be dependent upon the selected gear sizes. In the present instance this results in a reduction of 3 to 2. The rear axle and differential reduction of the vehicle is of course selected to cooperate with the geared reduction to provide an over-all reduction comparable to the so called direct drive of a conventional transmission.

Forward—overdrive

To achieve the maximum operating economy and smoothness of operation the transmission is designed to achieve an overdrive. This is accomplished by increasing the displacement of hydraulic unit A from the zero displacement position of the direct mechanical drive, with the displacement being increased in the opposite direction so as to produce a rotation of hydraulic unit B in the same direction as unit A. As seen in the diagrammatic sketch of Figure 3, the sun gear 49 thus rotates clockwise and achieves an increased output speed of the planet carrier 53 and the output shaft 14. The utilization of this overdrive range at times when additional power for acceleration for hill climbing is not required results in increased economy, and the lower engine speed contributes to smoothness and quietness of operation.

Controls

Figure 5:
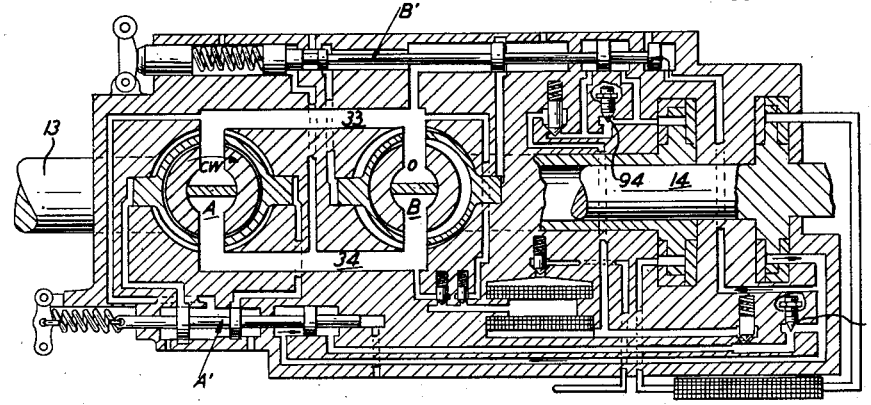
Figure 5 is a view similar to Figure 4 but showing the parts in position for direct mechanical drive.
Figure 6:
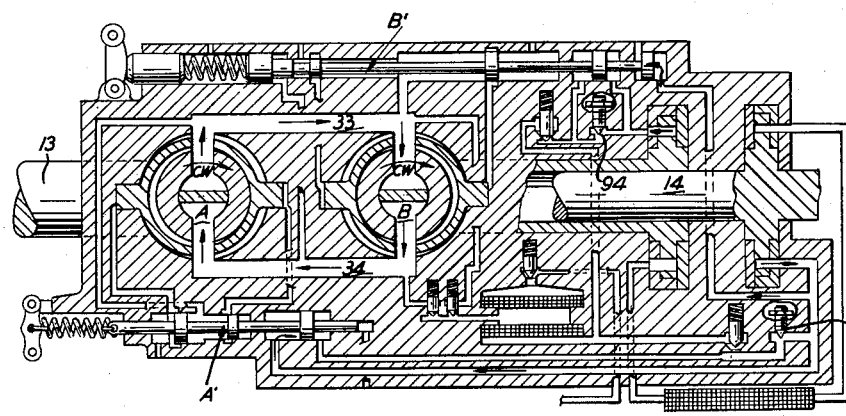
Figure 6 is a view similar to Figures 4 and 5 but illustrating the parts in position for overdrive operation.

Reference is now made to Figures 4, 5, and 6 for a description for the controls utilized in connection with the foregoing transmission.

A pair of reciprocable control valves B' and A' are provided, the control valve B' being arranged to control the displacement of hydraulic unit B, while the control valve A' is arranged to control the displacement of hydraulic unit A.

Control valve A' has a pair of axially spaced lands 61 and 62 arranged to control passageways 63 and 64 leading to the cylinders 23 and 24 at opposite ends of the casing for the hydraulic unit A. Valve A' is biased to the left by spring 66 and the tension on the spring can be varied by a manually operated lever 67. In addition, the valve A' may be biased to the right by means of a plunger 68. The opposite sides of which are exposed to a pressure differential created by the rear pump 58.

Pump 58 is driven by the output shaft 14 and is supplied with fluid from a sump 69. The output of the rear pump is transmitted through a passageway 71 to the left hand end of the plunger 68 of the control valve A', with the right hand end of the plunger being subjected to the smaller pressure in a passageway 72 resulting from a pressure drop created by an adjustable jet valve 73.

In the neutral position shown in Figure 4, the output shaft 14 is stationary and the rear pump 58 consequently is inoperative. The biasing effect of spring 66 thus urges control valve A' to the left of open passageway 63 and permit fluid from the manifold 33 of the hydraulic units to flow through passageway 74 and land 61 of the control valve A' into passageway 63. The pressure upon the piston portion 27 of the hydraulic unit A urges the body 26 to the right, since cylinder 24 at the opposite side of the rotor is connected by passageway 64 to the sump, to provide full displacement of unit A under these conditions. It will also be noted that a shoulder 76 is formed in the valve bore between lands 61 and 62 of the control valve A' so that the pressure from the manifold 33 through the passageway 74 will be differentially applied to the two lands, which are of different size, to bias the valve to the left as seen in Figure 4.

Control valve B' is formed with a pair of lands 81 and 82 controlling passageways 83 and 84 leading to the cylinders 23 and 24 at opposite sides of the hydraulic unit B. A passageway 86 leads from the manifold 33 to the valve bore for the control valve B', and it will be seen that reciprocation of the valve B' alternately connects the opposite ends of the piston portions 27 and 28 of the unit B to pressure and exhaust so as to vary its displacement.

Control valve B' is biased to the right by the coil spring 87, the effect of which may be varied by means of a manually operated lever 88. The shoulder 89 in the valve bore and the consequent application of pressure from the manifold 33 to the different sized lands 81 and 82 likewise creates a bias to the right. The valve is biased to the left by means of a plunger 91 the opposite sides of which are exposed to differential pressure from the front pump 52. The outlet from the front pump 52 leads to the right hand end of the plunger 91 by means of a passageway 92 while the left hand side of the plunger 91 is subjected to the reduced pressure in the passageway 93 resulting from the pressure drop over the adjustable jet 94.

Control valve B' is biased to the left by means of pressure from the manifold 34 transmitted through passageway 99 to the land 101 of the valve. In this manner valve B' is held in a position to produce zero pressure in the hydraulic system and zero torque on the output shaft 14, until the operator disturbs the balance to produce either forward or reverse vehicle drive by changing the tension on spring 87 through the manual control 88. The balance can also be disturbed by increasing the speed of pump 52 which changes the differential pressure on the land at 91 of valve B'.

Since the front pump 52 is driven by the sun gear, which rotates at the speed of the hydraulic unit B, during neutral a force is applied to the plunger 91 of the control valve B' opposing the force of the spring 87. The valve may be adjusted so as to hold the plunger in the position shown in Figure 4 for the desired neutral or idling speed of the vehicle engine.

*Reverse*

Reverse is obtained by manual operation of the control lever 88 in a clockwise direction around its pivot 95 to move plunger 96 and spring 87 to the right to apply a biasing effort upon the control valve B'. Control valve B' is thus moved to the right from the position shown in Figure 4 to uncover passageway 84 and admit pressure from manifold 33 through passageways 86 and 84 to the cylinder 24 at the right hand end of the hydraulic unit B. The rotor 29 of the unit B is thus moved to the left to decrease the displacement thereof. With the displacement of B being decreased, the speed of B increases relative to the speed of A and in the opposite direction. As previously mentioned in connection with the diagram shown in Figure 3, this results in an increased counterclockwise rotation of the sun gear 49 to rotate the planet carrier and the output shaft in a counterclockwise or reverse direction. The ratio change in reverse is of course constantly variable and dependent upon the change in displacement of the unit B.

*Forward—underdrive*

Forward speed can be obtained from the neutral position shown in Figure 4 automatically by increasing the speed of the vehicle engine. This is done conventionally by means of a carburetor accelerator control (not shown) to increase the speed of the input shaft 13 which in turn increases the speed of the hydraulic unit A and the ring gear 47. The resulting increase in speed of unit B and sun gear 49 results in an increase in speed of pump 52 to create a larger pressure drop over the jet valve 94 and to apply a greater biasing effect upon the plunger 91 of the control valve B' to move the latter to the left and admit fluid through passageway 83 to the left hand cylinder 23 of the hydraulic unit B to increase its displacement. This biasing effect is opposed by pressure from passageway 86 acting on the land 82 proportionate to the torque on the output shaft 14, to prevent excessive torque build-up.

With the discplacement of unit B increased it will slow down relative to A, slowing down sun gear 49 and imparting forward or clockwise rotation to the planet carrier 53 and the output shaft 14. At the same time the pressure build-up in manifold 33 is applied through the passageway 86 to the differential area of the lands 81 and 82 of the control valve B' to provide the desired torque balance for maximum acceleration. As the sun gear speed decreases, the output of the front pump 52 is decreased but this is compensated by the application of hydraulic pressure to the right hand end 97 of the control valve B' through the passageway 98 which interconnects with the output passageway 71 of the rear pump 58. As the forward vehicle speed increases, of course, the rear pump 58 comes into operation and supplies speed responsive pressure to the valve B' in this manner.

As the vehicle speed increases the output of the rear pump 58 increases until the pressure drop across the jet valve 73, which is applied to the plunger 68 of the control valve A' through the passageways 71 and 72, is sufficient to bias the valve A' to the right to admit fluid pressure from the manifold supplied passageway 74 to passageway 64 leading to the cylinder 24 at the right hand end of the hydraulic unit A. The displacement of unit A is thus gradually decreased and this decrease is of course accompanied by a decrease in the speed of rotation of unit B and the interconnected sun gear 49. This continues until the displacement of unit A reaches zero, blocking the flow of fluid through the manifolds 33 and 34 between the units A and B and stopping the rotation of the sun gear 49.

With the sun gear 49 held stationary the planet carrier rotates in a clockwise or forward direction so that full engine power is supplied mechanically through the planetary gearset. It will of course be noted that the ratio between the hydraulic and mechanical power division changes progressively so that the amount of hydraulic power transmission is gradually decreased to zero as the direct mechanical drive condition is approached.

Figure 5 illustrates the position of the controls during direct mechanical gear drive, and it will be noted that unit A is at zero displacement while unit B is at full displacement. Control valve B' is open to the passageway 83 to hold unit B at full displacement, while control valve A' is balanced so as to hold unit A at zero displacement.

*Overdrive*

As previously mentioned, overdrive is achieved by increasing the displacement of unit A in the opposite direction so as to achieve a rotation of unit B in the same direction of rotation as unit A. Control valve A', which controls the displacement of unit A, is biased toward the right by the speed responsive output of the rear pump 58 and to the left by the torque responsive differential pressure applied to the lands 61 and 62 of the valve from the manifold 33. When a stable speed or cruising drive condition is reached, the torque requirement will decrease and the speed responsive bias on valve A' will overcome the torque responsive bias, moving the valve to the right as shown in Figure 6 to open passageway 64 to the cylinder 24 at the right hand end of the hydraulic unit A, at the same time opening passageway 63 at the left hand end of unit A to the sump. The displacement of unit A is thus gradually increased in the opposite direction and effects an increasing rotation of unit B in the same direction of rotation as unit A. As noted in the diagrammatic sketch of Figure 3, this creates an overdrive and speeds up the planet carrier and output shaft relative to the speed of the input shaft.

*Deceleration*

With this transmission it is possible for the operator to obtain deceleration control without the application of the wheel brakes. For purposes of this description, it will be assumed that the transmission is operating in the overdrive range as shown in Figure 6. As the engine throttle is closed a reversal or drive may take place with the vehicle momentum in control. Under these conditions the pressure in manifold 33 drops while that in manifold 34 rises. It will be noted that the pressure in manifold 34 is applied through passageway 99 to the head 101 of control valve B' to apply a biasing effect to the valve tending to shift the latter to the left and opening passageway 83 to hold full displacement of unit B, for direct drive at 1–1 ratio. Release of the accelerator pedal by the operator first closes the engine throttle and then increases the tension on spring 66 to counteract the pressure effect of speed responsive pump 58 on land 68, shifting valve A' to the left and gradually shifting unit A to zero displacement. The hydraulic unit B and sun gear 49 will thus be prevented from rotating, and when the hydraulic unit A assumes a zero displacement position the engine will be driven mechanically at one and one half times the speed of the output shaft 14. As the vehicle speed decreases, pump 58 slows down and therefore delivers less differential pressure to land 68 of valve A', permitting spring 66 to bias valve A' to the left, gradually increasing the displacement of unit A. This rotates unit B in a counterclockwise direction to provide a maximum deceleration ratio of 3–1.

In this manner the deceleration can be controlled throughout the entire range by the manual operation of the throttle control of the engine. Additional deceleration can be obtained by connecting the manual control 88 to a low pedal which can be substituted for the conventional clutch pedal, and the operation of this control can be used to pinpoint stopping, effect reversing, prevent forward creep at fast engine idle, and consequently minimize the necessity for use of the conventional brake mechanism.

It will be understood that the invention is not to be limited to the exact construction shown and described, but that various changes and modifications may be made without departing from the spirit and scope of the invention, as defined in the appended claims.

What is claimed is:

1. In a variable speed transmission, an input shaft, an output shaft, a pair of hydraulically interconnected variable displacement hydraulic units, a planetary gear set having three gear elements, means for connecting said input shaft to one of said hydraulic units and to one of said gear elements, means for connecting the other of said hydraulic units to a second gear element of said planetary gear set, means for connecting the third element of said planetary gear set to said output shaft, control means for varying the displacement of said one and said other hydraulic units to continuously vary the geared ratio between said input and output shafts, a pair of fluid pumps, one of said pumps being connected to said other hydraulic unit and the other being driven by said output shaft, a pair of hydraulic control valves adapted to control the displacement of said one and said other hydraulic units, means for conducting the delivery pressure of each of said fluid pumps to a separate one of said control valves for biasing said valves with a force proportional to the speed of said other hydraulic unit and the speed of said output shaft respectively, and torque responsive means for biasing said pair of control valves in directions opposite to the bias of the delivery pressure of said fluid pumps.

2. The structure defined by claim 1 which is further characterized in that the torque responsive means comprise hydraulic conduits, from the interconnections between the first and second hydraulic units to said control valves, and manual means further biasing said control valves.

3. In a variable speed transmission, an input shaft, an output shaft, a variable displacement hydraulic unit mechanically connected to said input shaft, a second variable displacement hydraulic unit, a pair of fluid manifolds interconnecting said hydraulic units, a planetary gearset having three geared elements, means connecting one of said geared elements to said input shaft, means connecting a second of said geared elements to said second hydraulic unit, means connecting the third of said geared elements to said output shaft, a pair of control valves for controlling the displacement of said first and second hydraulic units, a speed responsive pump, means connecting the output of said speed responsive pump to said control valves to bias the latter in one direction, means connecting said pair of manifolds to said control valves to bias said control valves in the opposite direction in response to torque, and manual means for further biasing said control valves.

4. The structure defined by claim 3 which is further characterized in that the three geared elements in said planetary gearset comprise a ring gear, a sun gear, and a planet carrier, said ring gear being connected to said input shaft, said sun gear being connected to said second hydraulic unit, and said planet carrier being connected to said output shaft.

5. In an infinitely variable power transmission mechanism for transmitting a driving torque from a driving member to a driven member, a pair of variable displacement hydraulic units, a first and a second manifold interconnecting the high pressure sides and the low pressure sides of said hydraulic units respectively, a first positive displacement pump drivably connected to said driven member, a planetary gear unit comprising a sun gear, a ring gear and a planet gear carrier, one of said variable displacement hydraulic units being coupled to said ring gear, the other of said variable displacement hydraulic units being connected to said sun gear, said carrier being connected to said driven member, a second positive displacement pump drivably coupled to said sun gear, first conduit structure interconnecting one of said manifolds and opposed portions of a first one of said variable displacement hydraulic units, second conduit structure interconnecting said one manifold and opposed portions of a second one of said variable displacement hydraulic units, and separate valve means situated in and partly defining each of said conduit structures, each of said valve means including a movable valve element having a portion thereof subjected to the fluid pressure in said one manifold thereby causing variable valve element biasing forces, and separate pressure passage means for hydraulically connecting each of said first and second positive displacement pumps with a separate one of said valve means, respectively, to establish pressure forces for urging the movable valve elements against the aforesaid valve element biasing forces.

6. In an infinitely variable power transmission for transmitting a driving torque from a driving member to a driven member, a pair of variable displacement hydraulic units capable of operating alternately as a fluid motor and as a fluid pump, a first and a second manifold interconnecting the discharge side of one hydraulic unit with the intake side of the other hydraulic unit and interconnecting the intake side of said one hydraulic unit with the discharge side of said other hydraulic unit respectively, a first fixed displacement pump drivably connected to said driven member, a planetary gear unit comprising a sun gear, a ring gear and a planet gear carrier, one of said variable displacement hydraulic units being coupled to said driving member and to said ring gear, the other of said variable displacement hydraulic units being connected to said sun gear, said carrier being connected to said driven member, a second fixed displacement pump drivably coupled to said sun gear, first and second valve chambers, fluid pressure operated means for regulating the displacement of said hydraulic units including pressure passages extending from each of said valve chambers to a separate one of said hydraulic units, other pressure passages extending from each valve chamber to one of said manifolds for establishing a torque sensitive pressure in each valve chamber, a movable valve element disposed in each of said valve chambers and adapted to selectively distribute fluid pressure from said one manifold to the associated hydraulic unit, first conduit means for transferring fluid pressure from a first of said fixed displacement pumps to said second valve chamber and second conduit means for transferring fluid pressure from said second fixed displacement pump to said first valve chamber, the fluid pressure of said first and second fixed displacement pumps thereby being caused to act on the valve elements associated with said second and said first valve chambers respectively, the latter pressures and the above mentioned torque sensitive pressure establishing opposed valve biasing forces capable of adjustably positioning said valve elements to vary the displacement of said hydraulic units.

7. In an infinitely variable power transmission for a wheeled vehicle capable of transmitting a driving torque from a vehicle engine to a driven member, a pair of variable displacement hydraulic units capable of operating alternately as a fluid motor and as a fluid pump, a first and second manifold interconnecting the discharge side of one unit with the intake side of the other unit and interconnecting the intake side of said one unit with the discharge side of said other unit respectively, a source of vehicle speed sensitive fluid pressure, a source of fluid pressure sensitive to changes in engine speed, a planetary gear unit comprising a sun gear, a ring gear and a planet gear carrier, one of said variable displacement hydraulic units being coupled to said engine and to said ring gear, the other of said variable displacement hydraulic units being connected to said sun gear, said carrier being connected to said driven member, a source of engine torque sensitive pressure, hydraulically operated means for varying the displacement of each of said hydraulic units, separate pressure passages interconnecting one of said manifolds with each of said hydraulically operated means for transmitting pressure to the latter, first and second valve means defining in part each of said separate passages respectively, each of said valve means including a movable valve element adapted to control the degree of communication between said manifold and each of said hydraulically operated means, and a separate passage means extending between each valve means and a separate one of said speed sensitive pressure sources for subjecting each valve element to opposed valve element positioning hydraulic pressure forces.

8. An infinitely variable power transmission mechanism for a wheeled vehicle capable of transmitting a driving torque from a vehicle engine to a driven member, a pair of variable displacement hydraulic units capable of operating alternately as a fluid motor and as a fluid pump, a first and second manifold interconnecting the discharge side of one unit with the intake side of the other unit and interconnecting the intake side of said one unit with the discharge side of said other unit respectively, a source of vehicle speed sensitive fluid pressure, a source of fluid pressure sensitive to changes in engine speed, a planetary gear unit comprising a sun gear, a ring gear and a planet gear carrier, one of said variable displacement hydraulic units being coupled to said engine and to said ring gear, the other of said variable displacement hydraulic units being connected to said sun gear, said carrier being connected to said driven member, hydraulically operated means for varying the displacement of each of said hydraulic units, separate pressure passages interconnecting one of said manifolds with each of said hydraulically operated means for transmitting pressure to the latter, first and second valve means defining in part each of said separate passages respectively, each of said valve means including a movable valve element adapted to control the degree of communication between said one manifold and each of said hydraulically operated means, and separate passage means including a portion extending between each valve means and a separate one of said fluid pressure sources and a portion extending between each valve means and one of said manifolds for subjecting each valve element to opposed valve element positioning forces to control the displacement of the hydraulic units in accordance with the operating requirements.

9. In an infinitely variable power transmission mechanism for a wheeled vehicle capable of transmitting a driving torque from a vehicle engine to a driven member, a pair of variable displacement hydraulic units capable of operating alternately as a fluid motor and as a fluid pump, a first and second manifold interconnecting the discharge side of one unit with the intake side of the other unit and interconnecting the intake side of said one unit with the discharge side of the other unit respectively, a first fixed displacement pump drivably connected to said driven member, a planetary gear unit comprising a sun gear, a ring gear and a planet gear carrier, a second fixed displacement pump drivably connected to said sun gear, one of said variable displacement hydraulic units being coupled to said engine and said ring gear, another of said variable displacement hydraulic units being connected to said sun gear, said carrier being connected to said driven member, hydraulically operated means for varying the displacement of each of said hydraulic units, pressure passages interconnecting one of said manifolds with each said hydraulically operated means for transmitting pressure to the latter, first and second valve means defining in part each of said passages respectively, each of said valve means including a movable valve element adapted to control the degree of communication between said one manifold and a separate one of said hydraulically operated means, said first fixed displacement pump providing a vehicle speed sensitive pressure and said second fixed displacement pump providing a pressure sensitive to changes in engine speed, separate passages extending between each valve means and a separate one of said fixed displacement pumps, other passages connecting each valve means with one of said manifolds thereby subjecting each valve element to a torque sensitive pressure, said torque sensitive pressure and one of said speed sensitive pressures providing balanced opposed valve element positioning forces for each valve element, and manual means for overruling said balanced valve element positioning forces to accommodate a change in the driving gear ratio at the will of the vehicle operator.

10. In an infinitely variable power transmission mechanism for a wheeled vehicle capable of transmitting a driving torque from a vehicle engine to a driven member, a pair of variable displacement hydraulic units capable of operating alternately as a fluid motor and as a fluid pump, a first and a second manifold interconnecting the discharge side of one unit with the intake side of the other unit and interconnecting the intake side of said one unit with the discharge side of the other unit respectively, a first fixed displacement pump drivably connected to said driven member, a planetary gear unit comprising a sun gear, a ring gear and a planet gear carrier, a second fixed displacement pump drivably connected to said sun gear, one of said variable displacement hydraulic units being coupled to said engine and said ring gear, another of said variable displacement hydraulic units being connected to said sun gear, said carrier being connected to said driven member, hydraulically operated means for varying the displacement of each of said hydraulic units, first pressure passages interconnecting one of said manifolds with each of said hydraulically operated means for transmitting pressure to the latter, first and second valve means defining in part each of said first passages respectively, each of said valve means including a movable valve element adapted to control the degree of communication between said one manifold and each of said hydraulically operated means, a second fixed displacement pump drivably connected to said sun gear, said first fixed displacement pump providing a vehicle speed sensitive fluid pressure signal and said second fixed displacement pump providing a fluid pressure signal sensitive to changes in engine speed, separate passages extending between each valve means and a separate one of said fixed displacement pumps, second passages interconnecting each valve means and one of said manifolds thereby subjecting each of said valve elements to a torque sensitive pressure, said torque sensitive pressure and one of said speed sensitive pressure signals providing balanced opposed valve element positioning forces, and manual means for overruling said balanced valve element positioning forces to accommodate a change in the driving gear ratio at the will of the vehicle operator, the operating speed of said second fixed displacement pump decreasing and the operating speed of said first fixed displacement pump increasing as the vehicle accelerates, and an auxiliary pressure passage extending from said first fixed displacement pump to the valve element associated with said one hydraulic unit for supplementing the valve element biasing force created by the pressure signal supplied by said second fixed displacement pump.

11. In an infinitely variable power transmission mechanism for transmitting a driving torque from a driving member to a driven member, a pair of variable displacement hydraulic units capable of operating alternately as a fluid motor and as a fluid pump, a first and a second manifold interconnecting the discharge side of one unit with the intake side of the other unit and interconnecting the intake side of said one unit with the discharge side of the other unit respectively, a first fixed displacement pump drivably connected to said driving member, a planetary gear unit comprising a sun gear, a ring gear and a planet gear carrier, one of said variable displacement hydraulic units being coupled to said driven member and to said ring gear, the other of said variable displacement hydraulic units being connected to said sun gear, the carrier being connected to said driven member, a second fixed displacement pump drivably coupled to said sun gear, first and second valve chambers, fluid pressure operated means for regulating the displacement of said hydraulic units including pressure passages extending from each of said chambers to a separate hydraulic unit, other pressure passages extending from each valve chamber to one of said manifolds for establishing a torque sensitive pressure in each valve chamber, a movable valve element disposed in each of said valve chambers and adapted to distribute fluid pressure from said one manifold to the associated hydraulic unit, first conduit means for transferring fluid pressure from said first fixed displacement pump to said second valve chamber and second conduit means for transferring pressure from said second fixed displacement pump to said first valve chamber, each of said conduit means including first and second branch conduits extending to opposed portions of the associated valve element, one of said branch conduits including a calibrated restriction for producing a pressure drop thereacross, and a valve controlled orifice interposed between said one branch conduit and a low pressure region of said mechanism for accommodating a flow of fluid across said restriction.

12. In an infinitely variable power transmisison mechanism for a wheeled vehicle capable of transmitting a driving torque from a vehicle engine to a driven member, a pair of variable displacement hydraulic torque mechanisms each having fluid inlet and outlet portions, a planetary gear unit including a sun gear, a ring gear and a planet gear carrier, said ring gear being connected to said driven member, said engine being drivably coupled to said ring gear and to one of said mechanisms, the other of said mechanisms being drivably connected to said sun gear, manifolding including a passageway connecting the intake portion of said one mechanism to the outlet portion of said other mechanism and another passage connecting the outlet portion of said one mechanism to the inlet portion of said other mechanism, said manifolding defining a closed hydraulic circuit in which one of said mechanisms functions as a pump and the other acts as a motor, each mechanism including means for regulating the fluid displacement thereof, a first fluid pump drivably connected to said driven member and adapted to provide a vehicle speed sensitive pressure, a second fluid pump drivably connected to said sun gear to provide a vehicle engine speed sensitive pressure, first passage structure connecting said first pump to the displacement regulating means for one mechanism and second passage structure connecting said second pump to the displacement regulating means for the other mechanism, and valve means for regulating the magnitude of the effective pressure applied to each mechanism, each of said valve means including portions subjected to the fluid pressure existing in one of said manifold passages and to the pressure existing on the down stream side of a separate one of said pumps thereby establishing balanced valve control forces, and manual means for adjusting each of said valve means and for overruling said control forces.

13. An infinitely variable power transmission mechanism for delivering power from a driving member to a driven member, first and second variable displacement hydraulic units, a planetary gear unit including a sun gear element, a ring gear and a planet gear carrier, a first fluid pump drivably connected to said sun gear and a second fluid pump drivably connected to said driven member, the latter being connected to said carrier and said driving member being connected to said ring gear, said first and second hydraulic units being drivably connected to said driving member and to said sun gear respectively, a fluid circuit including manifolding interconnecting each of said units to form a closed hydraulic pumping circuit, hydraulically operated means for varying the displacement of each of said hydraulic units including valve means for selectively distributing fluid pressure from said manifolding to said hydraulically operated means for energizing the latter, a fluid pressure passage including portions extending from the discharge side of one of said pumps to a low pressure region of said fluid circuit, a precalibrated fluid flow restriction located in said passage, and another portion of said passage being adapted to transfer the pressure differential existing across said restriction to a portion of said valve means thereby creating control forces for regulating the operation of said portion of said valve means.

14. An infinitely variable power transmisison mechanism for delivering power from a driving member to a driven member, first and second variable displacement hydraulic units, a planetary gear unit including a sun gear, a ring gear and a planet gear carrier, a first fluid pump drivably connected to said sun gear and a second fluid pump drivably connected to said driven member, the latter being connected to said carrier and said driven member being connected to said ring gear, said first and second hydraulic units being drivably connected to said driving member and to said sun gear respectively, a fluid circuit including manifolding interconnecting each of said units to form a closed hydraulic pumping circuit, hydraulically operated means for varying the displacement of each of said hydraulic units comprising valve means including movable valve elements for selectively distributing fluid pressure from said manifolding to said hydraulically operated means for energizing the latter, a first fluid pressure passage including a portion extending from the discharge side of one of said pumps to a low pressure region of said fluid circuit, a fluid flow restriction located in said passage portion, another portion of said passage being adapted to transfer the pressure differential existing across said restriction to a portion of said valve means, another fluid pressure passage interconnecting said portion of said valve means and said manifolding, the fluid pressure applied to said portion of said valve means by said first and by said other pressure passage providing opposed forces capable of adjustably positioning the associated valve element.

15. In an infinitely variable power transmission mechanism for delivering power from a driving member to a driven member, first and second variable displacement hydraulic units, a planetary gear unit including a sun gear, a ring gear and a planet gear carrier, a first fluid pump drivably connected to said sun gear and a second fluid pump drivably connected to said driven member, the latter being connected to said carrier and said driving member being connected to said ring gear, said first and second hydraulic units being drivably connected to said driving member and to said sun gear respectively, a fluid circuit including a pair of manifold passages interconnecting said hydraulic units to form a closed pumping circuit wherein one of said units acts as a hydraulic pump and the other acts as a hydraulic motor, hydraulic pressure responsive means for varying the displacement of each of said hydraulic units, first and second branch manifold passages extending from one of said manifold passages to the displacement varying means for said first and said second hydraulic units respectively, separate valve means in each of said branch manifold passages including a movable valve element for regulating the magnitude of the pressure applied to the associated displacement varying means, pump discharge passage means including portions extending from said first and second fluid pumps to the valve means associated with said second and said first branch manifold passages respectively, the discharge pressure for said fluid pumps and the manifold pressure in said branch manifold passages acting on said valve elements to produce balanced valve actuating forces, auxiliary passage means including a first portion extending from said second fluid pump to the valve means associated with said second branch manifold passage for subjecting the associated valve element to a biasing force to supplement the biasing effort produced by said first fluid pump and a second portion extending from the other of said manifold passages to said last named valve means for biasing the associated valve element to overcome the balanced forces acting thereon thereby tending to increase the displacement of said hydraulic unit.

16. In an infinitely variable power transmission mechanism for delivering power from a driving member to a driven member, first and second variable displacement hydraulic units, a planetary gear unit including a sun gear, a ring gear and a planet gear carrier, a first fluid pump drivably connected to said sun gear and a second fluid pump drivably connected to said driven member, the latter being connected to said carrier and said driving member being connected to said ring gear, said first and second hydraulic units being drivably connected to said driving member and to said sun gear respectively, a fluid circuit including a pair of manifold passages interconnecting said hydraulic units to form a closed pumping circuit wherein one of said units acts as a fluid pump and the other acts as a fluid motor, hydraulic pressure responsive means for varying the displacement of each of said hydraulic units, first and second branch manifold passages extending from one of said manifold passages to the displacement varying means for said first and said second hydraulic units respectively, separate valve means in each of said branch manifold passages including a movable valve element for regulating the magnitude of the pressure applied to the associated displacement varying means, pump discharge passage means including portions extending from said first and second fluid pumps to the valve means associated with said second and said first branch manifold passages respectively, the discharge pressure for said fluid pumps and the manifold pressure in said branch manifold passages acting on said valve elements to produce balanced valve actuating forces, auxiliary passage means including a first portion extending from said second fluid pump to the valve means associated with said second branch manifold passage for subjecting the associated valve element to a biasing force to supplement the biasing effort produced by said first fluid pump, a second portion extending from the other of said manifold passages to said last named valve means for biasing the associated valve element to overcome the balanced forces acting thereon thereby tending to increase the displacement of said hydraulic unit, and manual means for adjustably positioning each of said valve elements to overrule the hydraulic biasing force applied thereto.

References Cited in the file of this patent

UNITED STATES PATENTS

| 1,951,345 | Centervall | Mar. 20, 1934 |
| 2,646,755 | Joy | July 28, 1953 |

FOREIGN PATENTS

| 362,999 | Great Britain | Dec. 17, 1931 |
| 570,589 | Great Britain | July 13, 1945 |
| 875,303 | Germany | Apr. 30, 1953 |